United States Patent
Mueller et al.

(10) Patent No.: US 9,563,400 B2
(45) Date of Patent: Feb. 7, 2017

(54) OPTIMIZED STRUCTURE FOR HEXADECIMAL AND BINARY MULTIPLIER ARRAY

(71) Applicant: International Business Machines Corporation, Armonk, NY (US)

(72) Inventors: Silvia M. Mueller, Altdorf (DE); Son Dao Trong, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 14/489,960

(22) Filed: Sep. 18, 2014

(65) Prior Publication Data

US 2016/0085508 A1    Mar. 24, 2016

(51) Int. Cl.
G06F 9/48      (2006.01)
G06F 7/487     (2006.01)
G06F 9/52      (2006.01)

(52) U.S. Cl.
CPC .................................. G06F 7/4876 (2013.01)

(58) Field of Classification Search
None
See application file for complete search history.

(56) References Cited

U.S. PATENT DOCUMENTS

| | | | |
|---|---|---|---|
| 8,447,800 B2 | 5/2013 | Dockser et al. | |
| 8,463,834 B2 | 6/2013 | Lutz | |
| 8,606,840 B2 | 12/2013 | Ahmed | |
| 2010/0312812 A1 | 12/2010 | Wang | |
| 2012/0011181 A1 | 1/2012 | Samy et al. | |
| 2014/0067895 A1 | 3/2014 | Wang | |
| 2014/0244704 A1* | 8/2014 | Dao Trong | G06F 7/483 708/501 |
| 2015/0370537 A1* | 12/2015 | Kim | G06F 7/4876 708/501 |

OTHER PUBLICATIONS

"Optimized Structure for Hexadecimal and Binary Multiplier Array", U.S. Appl. No. 14/578,879, filed Dec. 22, 2014.
IBM Appendix P, list of IBM patents or patent applications treated as related, Dec. 22, 2014.

* cited by examiner

*Primary Examiner* — Scott Sun
(74) *Attorney, Agent, or Firm* — Isaac J. Gooshaw

(57) ABSTRACT

A method for hiding implicit bit corrections in a partial product adder array in a binary and hexadecimal floating-point multiplier such that no additional adder stages are needed for the implicit bit corrections. Two leading-one correction terms are generated for the fraction in the multiplier floating-point number and two leading-one correction terms are generated for the fraction in the multiplicand floating-point number. The floating-point numbers may be single-precision or double-precision. Each leading-one correction term for the single-precision case is appended to the left of an intermediate partial product sum in the adder array that is an input to an adder so as to not to extend the bits in the input further to the left than the bits in another input to the adder. Each leading-one correction term for the double-precision case replaces an adder input that is unused when base-2 floating-point numbers are multiplied.

9 Claims, 6 Drawing Sheets

OPTIMIZED STRUCTURE FOR HEXADECIMAL AND BINARY MULTIPLIER ARRAY

BACKGROUND OF THE INVENTION

The present invention relates generally to the field of floating-point multiplier design and more particularly to a microarchitecture for a fast floating-point multiplier.

The value of a number in a computer (a computer number) is expressed in an encoding of one or more adjacent patterns of bits that comprise the computer number, and whose format depends on the type of the number and is defined in the architecture of an instruction set. Fixed point, binary coded decimal, and floating-point are examples of types of numbers defined in instruction sets. A computer interprets the bits of a number and computer instructions manipulate the number according to the number's type and its base. A base assigns a value to a bit that depends on the position of the bit in the number relative to a radix point, an implicit location in the number defined by the architecture or a standard to which the architecture adheres. In a "floating-point" number, the radix point is fixed by the architecture, but can assume various positions in the values that a floating-point number can represent, i.e., the radix point is not fixed, i.e., it can "float", in the various values that a floating-point number can represent.

Floating-point numbers can represent extremely large and small numbers with a fixed number of bits; essentially accomplished by representing the value of a number as a product of two values in separate bit-fields within the number. A base-2 (binary) floating-point number, for example, is expressed with a sign bit (indicating positive or negative), a fraction (sometimes called mantissa) and an exponent. An implied bit (implicit bit) that is associated with the fraction, that is deduced and not physically present, is often used in binary floating-point numbers to increase the number of bits available to express the fraction or exponent. The fraction becomes a significand when the implied bit associated with the fraction is appended to the fraction. The exponent in a computer number is often not the real-exponent that is used to evaluate the number. A value called a bias is usually added to the real-exponent when the floating-point number is formed. The real-exponent is then the exponent minus the bias.

A floating-point number is evaluated by multiplying the significand by the base raised to the power of the real-exponent (i.e., the base times itself, the real-exponent number of times). Let x be the value of a floating-point number, then $x = \pm 1 \times \text{significand} \times \text{base}^{\text{exponent-bias}}$. For example, if the base is 2 and the bias is 128, as in one type of floating-point number in IEEE floating-point format, then $x = \pm 1 \times \text{significand} \times 2^{\text{exponent-128}}$. If the base is 16 and the bias is 64, as in one type of floating-point number in a floating-point hexadecimal format, then $x = \pm 1 \times \text{significand} \times 16^{\text{exponent-64}}$.

SUMMARY

Aspects of an embodiment of the present invention disclose a method for hiding implicit bit corrections in a partial product adder array in a binary and hexadecimal floating-point multiplier such that no additional adder stages are needed for the implicit bit corrections. The method includes generating a first implicit bit correction term for a base-2 multiplier with an implicit bit that is one and a second implicit bit correction term for the base-2 multiplier with an implicit bit that is zero. The method further includes generating a third implicit bit correction term for a base-2 multiplicand with an implicit bit that is one and a fourth implicit bit correction term for the base-2 multiplicand with an implicit bit that is zero. The method further includes determining a value of a first implicit bit of the base-2 multiplier and a value of a second implicit bit of the base-2 multiplicand. The method further includes receiving a plurality of partial products of a product of the base-2 multiplier and the base-2 multiplicand. The method further includes adding, the plurality of partial products of the base-2 multiplier and the base-2 multiplicand in an adder array. The method further includes appending a first actual implicit bit correction term to the immediate left of a first addend to a first adder in the adder array such that a number of bits in the first actual implicit bit correction term does not exceed a number of bit positions between a left-most bit of the first addend and a left-most bit of a second addend to the first adder. The method further includes appending a second actual implicit bit correction term to the immediate left of a third addend to a second adder in the adder array such that a number of bits in the second actual implicit bit correction term does not exceed a number of bit positions between a left-most bit of the first addend and a left-most bit of a fourth addend to the second adder.

Aspects of an embodiment of the present invention disclose an integrated circuit for hiding implicit bit corrections in a partial product adder array in a binary and hexadecimal floating-point multiplier such that no additional adder stages are needed for the implicit bit corrections. The integrated circuit chip includes one or more electronic circuits configured to generate a first implicit bit correction term for a base-2 multiplier with an implicit bit that is one and a second implicit bit correction term for the base-2 multiplier with an implicit bit that is zero. The integrated circuit chip further includes one or more electronic circuits configured to generate a third implicit bit correction term for a base-2 multiplicand with an implicit bit that is one and a fourth implicit bit correction term for the base-2 multiplicand with an implicit bit that is zero. The integrated circuit chip further includes one or more electronic circuits configured to determine a value of a first implicit bit of the base-2 multiplier and a value of a second implicit bit of the base-2 multiplicand. The integrated circuit chip further includes one or more electronic circuits configured to receive a plurality of partial products of a product of the base-2 multiplier and the base-2 multiplicand. The integrated circuit chip further includes one or more electronic circuits configured to add, the plurality of partial products of the base-2 multiplier and the base-2 multiplicand in an adder array. The integrated circuit chip further includes one or more electronic circuits configured to append the first actual implicit bit correction term to the immediate left of a first addend to a first adder in the adder array such that a number of bits in the first actual implicit bit correction term does not exceed a number of bit positions between a left-most bit of the first addend and a left-most bit of a second addend to the first adder. The integrated circuit chip further includes one or more electronic circuits configured to append the second actual implicit bit correction term to the immediate left of a third addend to a second adder in the adder array such that a number of bits in the second actual implicit bit correction term does not exceed a number of bit positions between a left-most bit of the first addend and a left-most bit of a fourth addend to the second adder.

DETAILED DESCRIPTION

Figure 1:
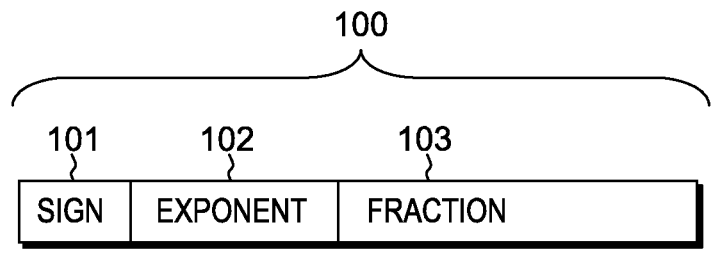
FIG. 1 depicts a block diagram of a floating-point number, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Floating-point numbers are useful in a wide variety of applications, but their use is compelling in scientific and engineering applications where precision is necessary and a wide range of numerical magnitudes may be experienced. Floating-point computation often occurs in large complex programs (e.g., weather and climate prediction, computational chemistry, and high-energy physics simulation) that are often executed on supercomputers in an environment in which the speed of a computation often determines an application's utility. The present invention recognizes the fact that the number of cycles that is required to multiply two floating-point numbers together, i.e., to perform a floating-point multiply, is often a substantial portion of the total execution time of a given application, and may determine whether a given computation is practical or not. For example, an application that predicts tomorrow's weather is not practical if it requires 24 hours to execute.

Because a floating-point number is expressed in a limited number of bits, a limited number of discrete numbers can be represented. The density of the numbers that can be expressed, i.e., how close the discrete numbers are to each other on the real number line, and how many discrete numbers can be expressed, are related to the precision of the floating-point number. The precision of a floating-point number is directly related to the number of bits in its significand. The magnitude of the most positive and negative numbers that it can express, as well as the smallest number that it can express i.e., a number closest to zero, determine a floating-point number's range.

Several techniques are often used to increase the utility of the limited number of bits available in a floating-point number. For example, to eliminate a need to use a bit to express the sign of the exponent, a "biased" exponent is employed. A fixed implicit value, called a bias, is subtracted from the exponent in a floating-point number to generate the true value of the exponent. For example, if the exponent is 8 and the bias is 128, the true value of the exponent is (8−128) or −120 and if the exponent is 138, the true value of the exponent is (138−128) or +10. In this way, positive and negative exponents are represented without using a sign bit, saving a bit-position.

If the exponent is non-zero in a base-2 floating-point number, the bits in the fractional part are always shifted to the left until a "1" bit (one binary digit) is in the left-most bit position. The exponent is adjusted to compensate for the value of the number being changed by the shift. A shift of the bits in the fraction to the left by one bit (equivalent to multiplying the fraction by 2) requires the value of the binary-based exponent to be decreased by one (equivalent to a division by 2). Since a "1" is always in the left-most position, it is not necessary to express the "1" in the number, and therefore the bit is not physically present—the "1" bit is understood to be present if the exponent is non-zero, and is called the implicit bit or the leading-one bit. This technique increases the number of bits available in the fraction by one, in turn increasing the precision of the number.

The most significant fraction bit (implicit bit) is one in a base-2 floating-point number only if the exponent is non-zero, otherwise the implicit bit is zero. When biased exponents are used and an exponent is zero, the real-exponent is at its largest negative value (because a negative bias is subtracted from the exponent to get the real-exponent, which results in the most negative real-exponent possible, when the bias is subtracted from zero) and therefore the value of the floating-point number is close to zero. Consequently, the value of the number cannot be decreased by adjusting its exponent. A left shift, to move a one into the most significant bit position of a fraction (the implicit bit), moves the radix point to the right, multiplying the value of the fraction by 2 for each left shift. Therefore, a left shift by one bit requires the exponent to become more negative to compensate for the multiplication, but this not possible as the exponent is already at its most negative value possible.

A similar technique is often applied to base-16 floating-point numbers: if the exponent is non-zero, the bits in the fractional part are shifted to the left, 4-bits at a time (one hexadecimal digit), until a "0" hexadecimal digit is in the left-most (implicit and not physically present) position and an explicit non-zero hexadecimal digit is immediately to the right of the implicit zero digit. The exponent is adjusted to compensate so that the value of the number after the shift remains as it was before the shift. Every shift to the left by one hexadecimal digit (a multiplication by 16) requires the value of the hexadecimal based exponent to be decreased by one (a division by 16) to compensate. This technique enables the precision of the fraction to be increased by eliminating leading zeros and also enables two floating-point numbers to be compared (e.g., greater than or less than) quickly by means of their exponents. If their exponents are different, the floating-point number with the larger exponent is the larger number. It is not possible to establish an implicit non-zero hexadecimal digit in a hexadecimal based floating-point number because the 4 bits of a leading hexadecimal digit can assume any of 16 possible values, precluding the possibility of a standard implicit value.

These techniques enable the range and/or precision achievable with a floating-point representation to be increased without using additional bits, but with the possible consequence of requiring specialized hardware to quickly decode (called unpacking) and manipulate (e.g., add, subtract, multiply, divide) an efficient floating-point representation. Embodiments of the present invention recognize that the speed of hardware associated with the evaluation and manipulation of an efficient floating-point representation can directly affect computer performance.

FIG. 1 depicts the three components of a representative floating-point number, floating-point number 100. Floating-point number 100 consists of sign 101, exponent 102, and fraction 103. Sign 101 is one bit and represents the sign of the fractional part of floating-point number 100, fraction 102. Exponent 102 is the exponent part of floating-point number 100. The value of exponent 102 is often a result of adding a bias value to the real-exponent.

Figure 2:
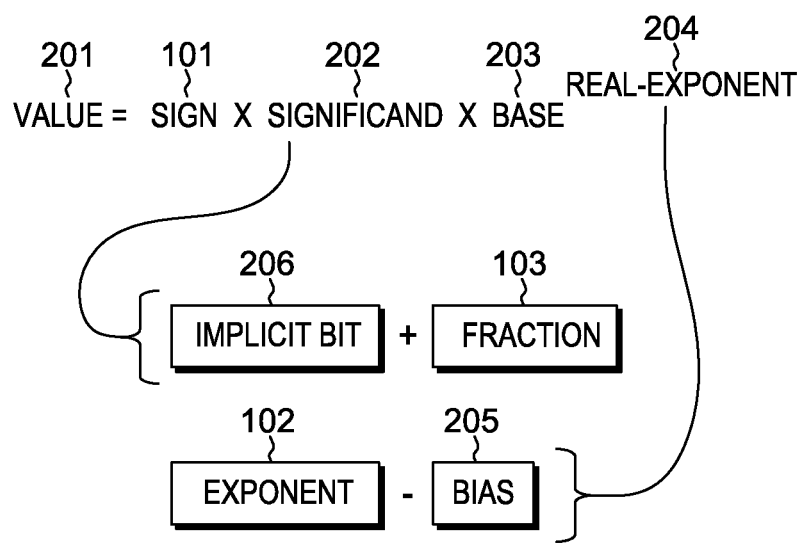
FIG. 2 depicts a value of the floating point-point number in FIG. 1, in accordance with an embodiment of the present invention.

FIG. 2 shows how floating-point number 100 is evaluated if it is a binary floating-point number. Bias 205 is subtracted from exponent 102 to form real-exponent 204. Implicit bit 206 is added to fraction 103 to form significand 202. Value 201, the value of floating-point number 100, is generated by multiplying significand 202 by sign 101 and by base 203 raised to the power of real-exponent 204.

A product of two floating-point numbers is formed by multiplying the fractional parts of the numbers together to form the fractional part of the result and summing the biased exponents. The bias is subtracted from the sum of the biased exponents to form the value of the real-exponent of the result. The sign of the product is obtained by performing an exclusive or (XOR) logic operation on the 1-bit signs of the two numbers. The product of two n-bit numbers is 2n-bits long, which may exceed the length of a floating-point register to hold the resulting product, and in such a case the product is rounded to the closest product value that will fit in a floating-point register. Floating-point registers often contain more bits than other general-purpose registers in an architecture. Rounding is a necessary and a non-trivial operation in floating-point arithmetic as a floating-point number is often an approximation to a real number and the closest approximation of a result to a real number result is desired. Converting a decimal number to a floating-point number, for example, usually involves rounding. Special techniques are used to manipulate infinity, zero, and undefined or unrepresentable values like 0/0, ∞/∞, and the square root of a negative number.

Floating-point numbers are often available in two or more precisions in an architecture; frequently single-precision and double-precision are available and sometimes an extended-precision. The format of each precision is specified in the architecture. A single-precision number has fewer bits than that in a double-precision number in its fraction and exponent. A single-precision number is often 32-bits long whereas a double-precision number is often 64-bits long. Computations that mix single and double-precision numbers are performed in double-precision, which requires conversion of a single-precision number to double-precision. These conversions usually do not affect performance. The present invention discloses a method to quickly multiply, in a common multiplier, the fractions of two single-precision or two double-precision floating-point numbers that are either both in base-2 or both in base-16.

Figure 3:
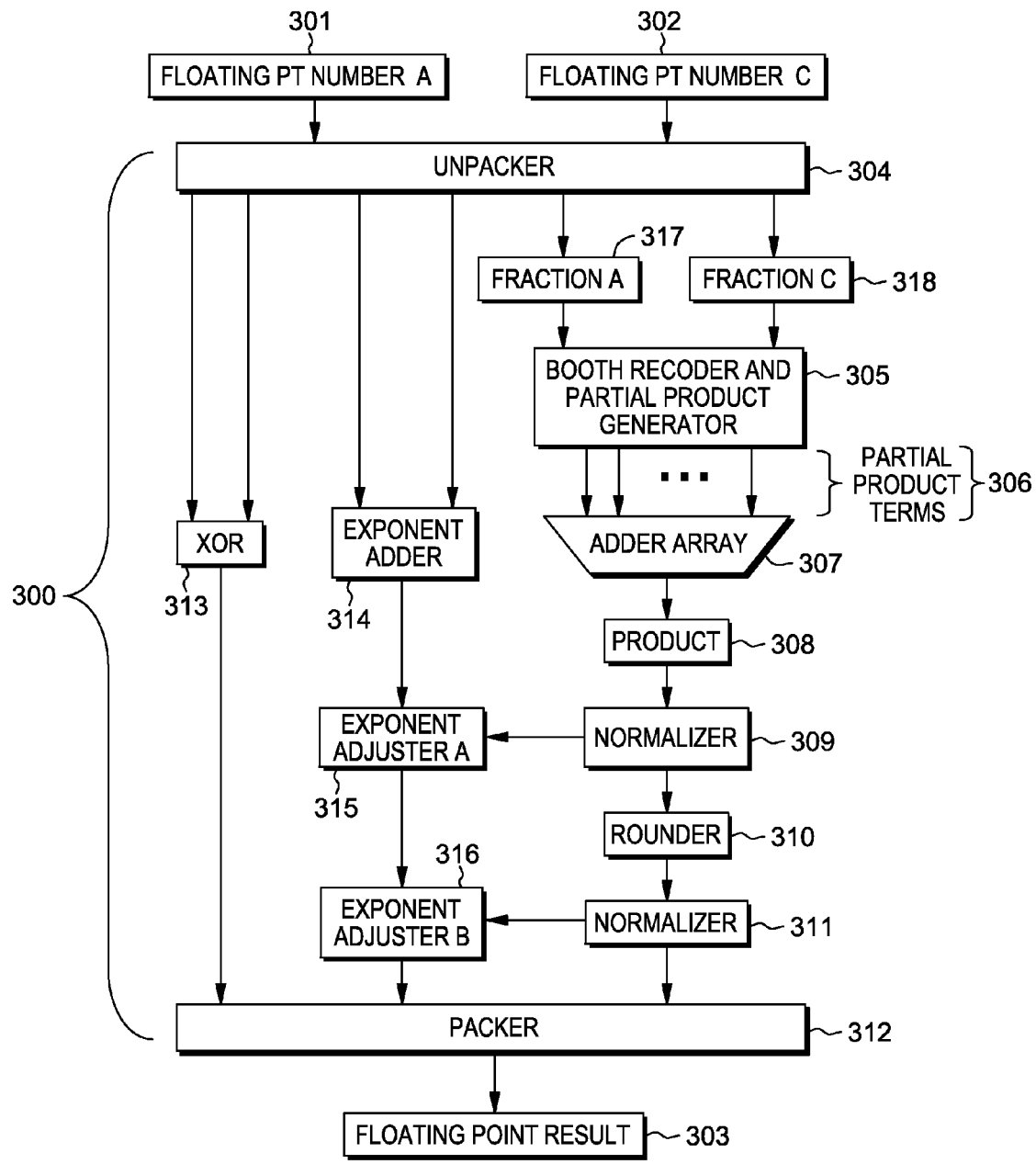
FIG. 3 depicts a block diagram of a floating-point multiplier, in accordance with an embodiment of the present invention.

FIG. 3 depicts the main functions performed in an illustrative floating-point multiplier, floating-point multiplier 300, which accepts floating-point number A 301, the multiplicand, and floating-point number C 302, the multiplier, as inputs and generates their product, floating-point result 303, as output. Unpacker 304 receives floating-point number A 301 and floating-point number C 302 as input, partitions them into the sign, exponent and fraction components of each number, and forms their significands by appending an appropriate implicit bit to their fractions. In an embodiment, floating-point number A 301 and floating-point number C 302 may both be base-2 floating-point numbers or both be base-16 floating-point numbers. In an embodiment, floating-point number A 301 and floating-point number C 302 may both be single-precision floating-point numbers or both be double-precision floating-point numbers.

Unpacker 304 forwards the fractional part of floating-point number A 301, fraction A 317, and the fractional part of floating-point number C 302, fraction C 318, to booth recoder and partial product generator 305, the exponent in each number to exponent adder 314, and the sign in each number to exclusive-or function XOR 313. XOR function 313 performs an exclusive-or logic operation on the two sign bits and forwards the 1-bit result to packer 312. Exponent adder 314 sums the two exponents, subtracts the bias from the sum, and forwards the exponent result to exponent adjuster A 315.

In an embodiment, the multiplier is encoded with a radix-4 modified booth encoder (MBE) algorithm by booth recoder and partial product generator function 305. Booth recoder and partial product generator function 305 applies the encoded multiplier to the multiplicand to generate k/2+1 partial product terms 306 (for a k-bit long multiplier). The operation of a radix-4 modified booth encoder is well known to those skilled in the art and there are many well-known ways to generate the partial product terms 306.

In an embodiment, adder array 307 sums partial product terms 306 in an adder array comprising a plurality of 4:2 carry-save adders. A 4:2 carry-save adder (sometimes known as a 4:2 compressor carry-save adder) is well known to those skilled in the art. Those skilled in the art understand that there are many ways to construct a 4:2 carry-save adder and that there are many other types of adders that can be used in adder array 307 to sum partial product terms 306, e.g., ripple-carry adder, carry-lookahead adder, and 3:2 carry-save adder. Adder array 307 produces the sum of partial product terms 305, product 308.

Product 308 may require one or more left-shifts to place a "1" in the implicit bit position in the fractional part of floating-point result 303. Normalizer 309 left-shifts product 308, a fraction, until it is normalized. A fraction is normalized if the fraction value is at least 1/b, where b is the base. In other words, the fraction has a value that would be too large to fit in the number of bits allocated to the fraction if it were multiplied by the base. This condition is met only when there is a "1" in the position immediately to the left of the left-most bit position in the fraction, the position of the implicit bit. Normalizer 309 causes exponent adjuster A 315 to decrease the value of the exponent result that it received from exponent adder 314 by one binary digit each time the fraction is left-shifted by 1-bit position to form an adjusted exponent. Normalizer 309 forwards the result of this first normalization, the first normalization result, to rounder 310 and exponent adjuster A 315 forwards the adjusted exponent to exponent adjuster B 316.

The first normalization result usually contains many more bits than can be accommodated in the fraction part of floating-point result 303, and the value expressed by these bits may lie somewhere between two expressible values, where the expression of each value is constrained to using the number of bits that are in the fraction part of floating-point result 303. Rounder 310 adjusts the value of the first normalization result to the expressible value that is closest to the value expressed by all the bits that it received from normalizer 309, the rounded value. This operation creates the smallest absolute error, the default mode of the IEEE Standard. The rounded value may require normalization and it is forwarded to normalizer 311. Normalizer 311 normalizes the rounded value and during the normalization process controls exponent adjuster B 316 to adjust the exponent in exponent adjuster B 316 to compensate for any bit-shifts that normalizer 311 performs. The floating point number is considered normalized if the fraction is at least 1/b, where b is the base. In other words, the fraction would be too large to fit if it were multiplied by the base. Normalizer 311 submits the normalized fraction to packer 312 and exponent adjuster B 316 submits the adjusted exponent to packer 312. Packer 312 constructs a formatted number, floating-point result 303 using the inputs from XOR 313, exponent adjuster 316, and normalizer 311.

In order to execute a floating-point multiplication quickly, the multiplication is often begun before the value of the implicit bit is known, i.e., before the exponent is known to be zero or non-zero. Therefore, a correction term for each eventuality for each of the two numbers is created and included in the computation later, after the exponent is known and therefore the actual value of the implicit bit is known. In this embodiment, four correction terms are created, one for each implicit bit value (implicit bit is one or zero) in each of the two floating-point numbers being multiplied together.

Given two floating-point numbers A and C in single-precision format, where: A=1aaa, if implicit bit is 1 in A and C=1ccc, if implicit bit is 1 in C, and A=0aaa, if implicit bit is 0 in A, and C=0ccc if implicit bit is 0 in. C, and if the implicit bits in A and C are both 1, then the product of A and C is A×C=(1000+0aaa)×(1000+0ccc)=1000000+0aaa000+0ccc000+(0aaa×0ccc). Therefore, when both implicit bits are 1, the two correction terms that must be added to the product (0aaa×0ccc), a product that is valid only when both implicit bits are 0, are 0ccc000 and 1aaa000. 1aaa000, is the sum of two terms: 1000000+0aaa000=1aaa000. In an embodiment, 0ccc000 is called loccSP (leading-one correction C single-precision) when C is in single-precision format. In an embodiment, 1aaa000 is called locaSP (leading-one correction A single-precision) when A is in single-precision format.

When only one implicit bit is one, for example the implicit bit of A, then, (1000+0aaa)×0ccc=0ccc000+(0aaa×0ccc),
and only one correction term is needed, that of 0ccc000 (loccSP in single-precision), which is one of two the correction terms (locaSP and loccSP in single-precision) needed when both implicit bits are one. No correction terms are needed when the implicit bits in both A and C are zero in single-precision.

Given two floating-point numbers A and C in double-precision format, where: A=1aaaaaa, if implicit bit 1 in A, and C=1cccccc, if implicit bit is 1 in C, and A=0aaaaaa, if implicit bit 0 in A, and C=0cccccc, if implicit bit is 0 in C, and if the implicit bits in A and C are both 1, then the product of A and C is A×C=(1000000+0aaaaaa)×(1000000+0cccccc)=1000000000000+0aaaaaa000000+0cccccc000
Therefore when both implicit bits are 1, the two correction terms that must be added to the product 0aaaaaa×0cccccc), a product that is valid only when both implicit bits are 0, are 0cccccc000000 and 1aaaaaa000000. 1aaaaaa000000, is the sum of two terms: 1000000000000+0aaaaaa000000=1aaaaaa000000. In an embodiment, 0cccccc000000 is called loccDP (leading-one correction C double-precision) when C is in double-precision format. In an embodiment, 1aaaaaa000000 is called locaDP (leading-one correction A double-precision) when A is in double-precision format.

When only one implicit bit is one, for example the implicit bit of A, then, (1000000+0aaaaaa)×0cccccc=0cccccc000000+(0aaaaaa×0cccccc),
and only one correction term is needed, that of 0cccccc000000, (loccDP in double-precision) which is one of two the correction terms (locaDP and loccDP in double-precision) needed when both implicit bits are one. No correction terms are needed when the implicit bits in both A and C are zero in double-precision.

Therefore, two correction terms are needed for the case when both A and C are in single-precision format (locaSP and loccSP), and two correction terms are needed for the case when both A and C are in double-precision format (locaDP and loccDP). In an embodiment, one or more of these four terms (locaSP, loccSP, locaDP, and loccDP) are generated before it is known which of them are needed, if any. In an embodiment, all of these four terms (locaSP, loccSP, locaDP, and loccDP) are generated before it is known which of them are needed, if any. In an embodiment, the generation of before it is known if one or more of them are needed, enables the summation of partial product terms 306 in adder array 307 to begin while locaSP, loccSP, locaDP, and loccDP are being generated. In an embodiment, the inclusion of one or more of the correction terms (locaSP, loccSP, locaDP, and loccDP) in the summation of partial product terms 306 in adder array 307, does not necessitate additional stages of addition in adder array 307. Therefore, in an embodiment, no additional adder stages are needed for implicit bit corrections.

Figure 4:
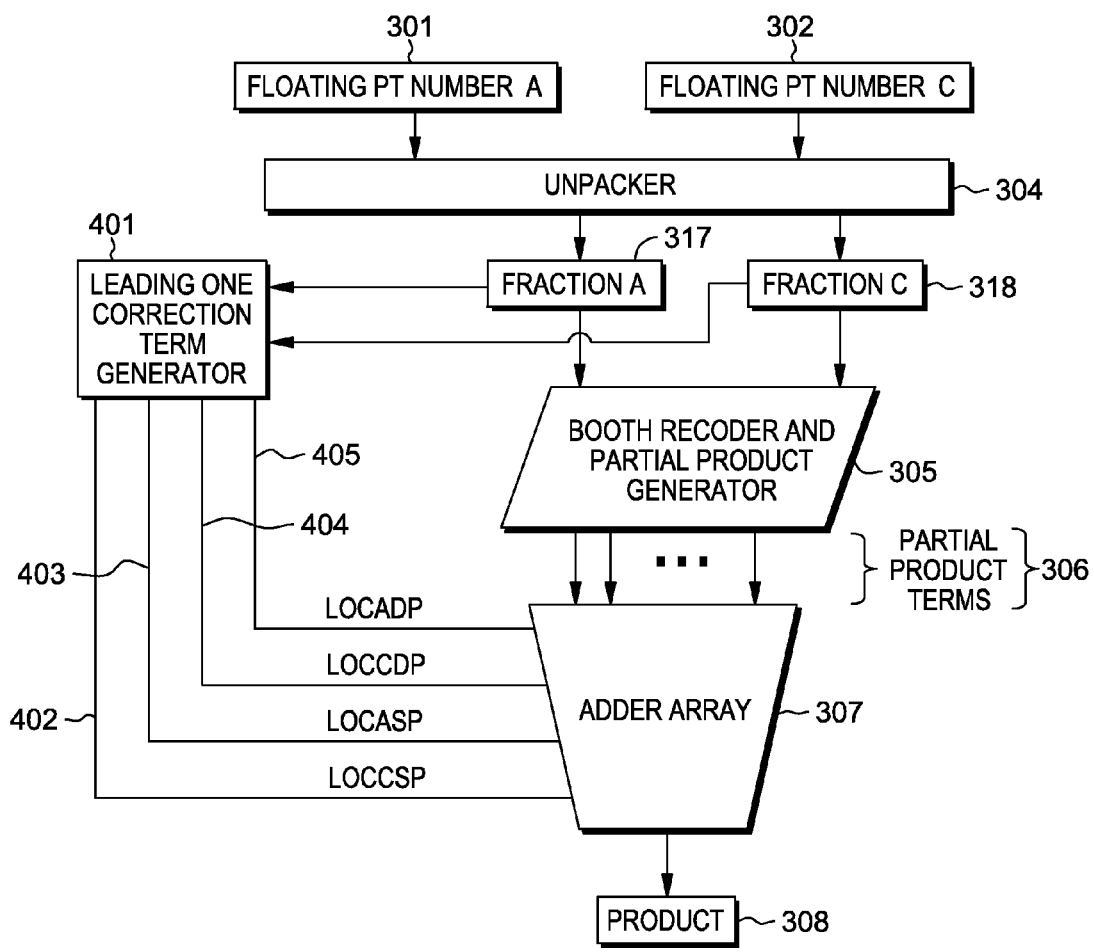
FIG. 4 depicts a detailed diagram of a portion of the floating-point multiplier in FIG. 3, in accordance with an embodiment of the present invention.

FIG. 4 depicts a section of floating-point multiplier 300 in more detail. In an embodiment, leadingone correction term generator 401 receives fraction A 317 and fraction C 318 from unpacker 304 and, if they are base-2 fractions, generates leading-one correction terms locaSP, loccSP, locaDP, and loccDP. Leading one correction term generator 401 outputs locaSP on locaSP 403 to adder array 307, outputs loccSP on loccSP 402 to adder array 307, outputs locaDP on locaDP 405 to adder array 307, and outputs loccDP on loccDP 404 to adder array 307. If fraction A 317 and fraction C 318 are in base-16, correction terms are not necessary because a base-16 floating-point number does not include an implicit value.

LocaDP 405 and loccDP 404 are inputs to adder array 307 and are added to partial product terms 306 to correct the summation of partial product terms 306 in adder array 307 for the leading-one terms of fraction A 317 and fraction C 318 when they are in double-precision format. In an embodiment, the correction occurs after the summation of partial product terms 306 in adder array 307 has begun so that the generation of the correction terms does not delay the summation of product terms 306 in adder array 307.

LocaSP 403 and loccSP 402 are inputs to adder array 307 and are added to partial product terms 306 to correct the summation of partial product terms 306 in adder array 307 for the leading-one terms of fraction A 317 and fraction C 318 when they are in single-precision format. In an embodiment, the correction occurs after the summation of partial product terms 306 in adder array 307 has begun so that the generation of the correction terms does not delay the summation of product terms 306 in adder array 307.

Figure 5:
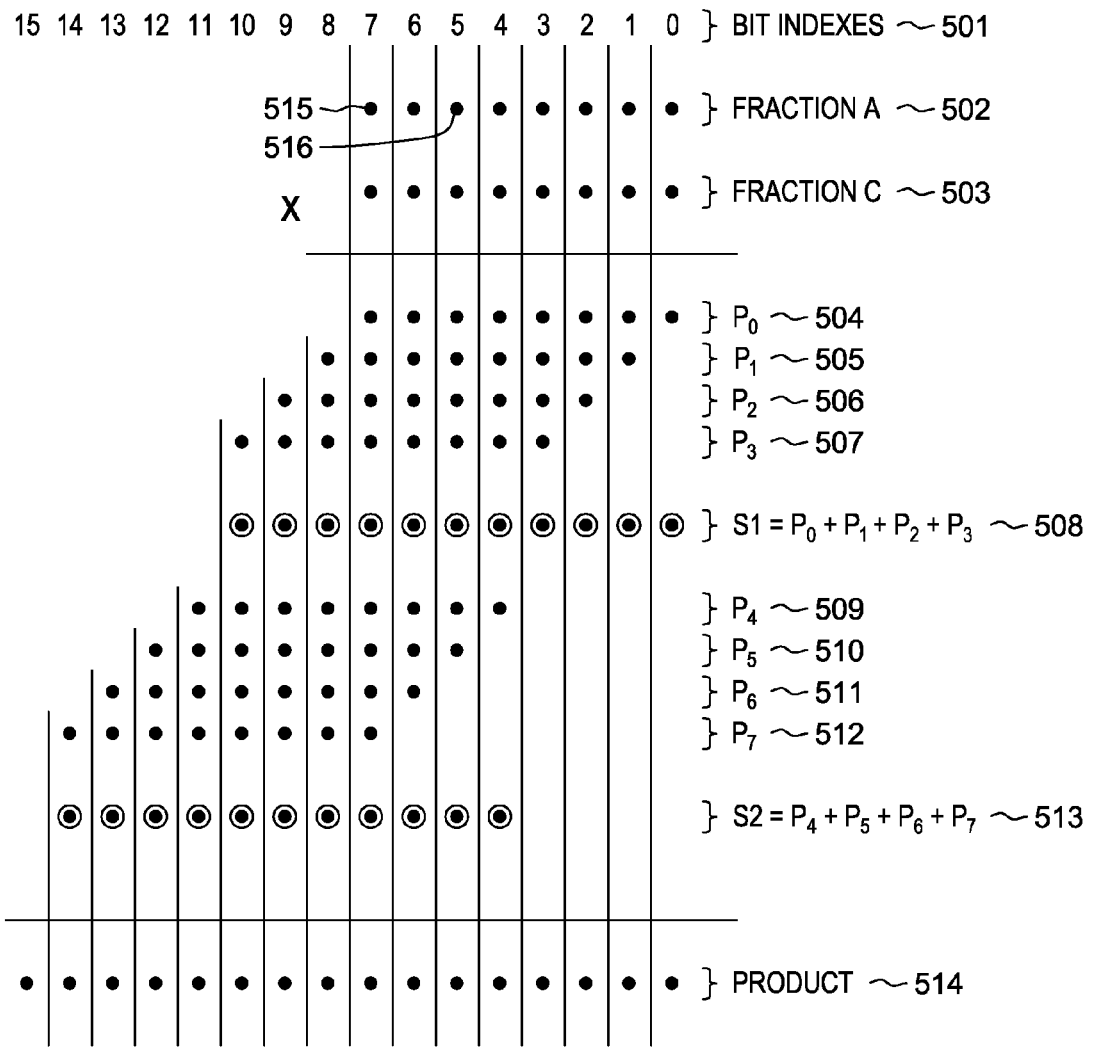
FIG. 5 depicts a multiplication of two fractional parts in two floating-pint numbers, in accordance with an embodiment of the present invention.
Figure 6:
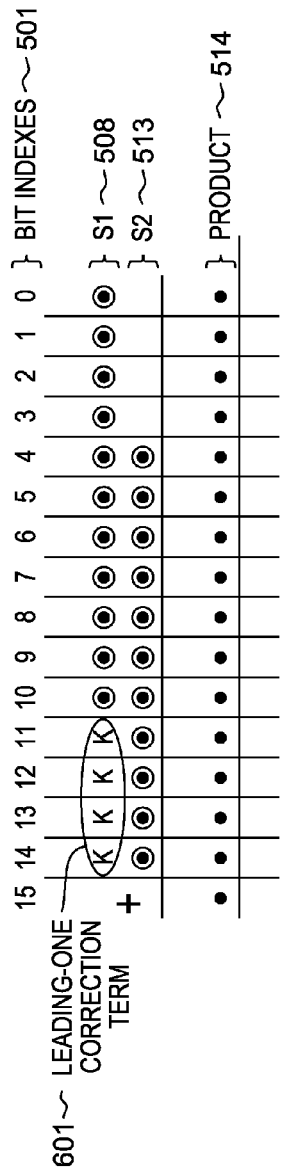
FIG. 6 depicts an alignment of bits in two intermediate sums in the multiplication of fractional parts depicted in FIG. 5, in accordance with an embodiment of the present invention.
Figure 7:
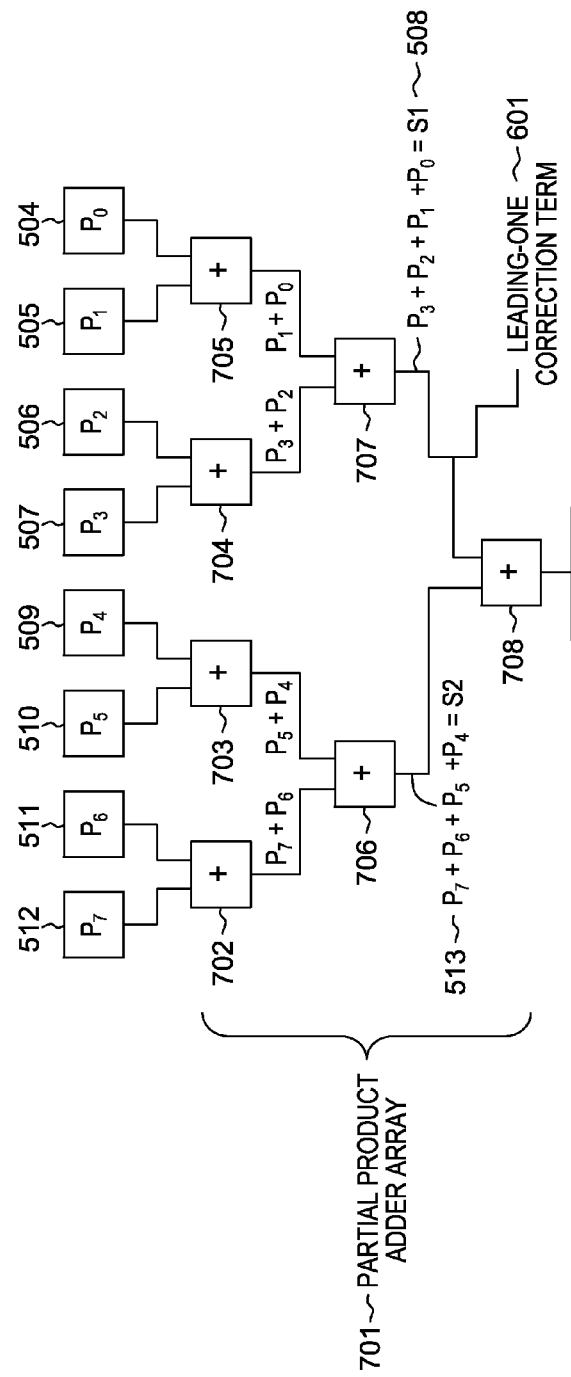
FIG. 7 depicts an adder array that sums the partial products depicted in FIG. 5 and in FIG. 6, in accordance with an embodiment of the present invention.

FIGS. 5, 6, and 7 present an embodiment of the present invention in which two fractions, fraction A 502 and fraction C 503 are each 8-bits in length. One skilled in the art understands that the lengths of fraction A 502 and fraction C 503 may be any length in accordance with an embodiment.

FIG. 5 depicts a multiplication of two base-2 values, fraction A 502 that is, as an example, 8-bits long multiplied by fraction C 503 that is, as an example, 8-bits long. A dot in FIG. 5 represents a bit and bit columns in FIG. 5 are indexed from 0 to 15 with bit indexes 501. A bit in a column having a lower index is less significant than a bit in a column having a higher index. For example, the bit represented by dot 515 in column 7 in fraction A 502 is more significant than the bit represented by dot 516 in column 5. Partial product term P0 504 is generated by multiplying fraction A 502 by the bit in bit column 0 of fraction C 503. Partial product term P1 505 is generated by multiplying fraction A 502 by the bit in bit column 2 of fraction C 503. Partial product terms P2 506, P3 507, P4 509, P5 510, P6 511, and P7 512 are generated by multiplying fraction A 502 by the bit in bit column 2, 3, 4, 5, 6, and 7, respectively, in fraction C 503. Product 514 of fraction A 502 and fraction C 503 is the summation of partial product terms P0 504, P1 505, P2 506, P3 507, P4 509, P5 510, P6 511, and P7 512. One skilled in the art understands that the summation of these partial product terms can be accomplished many ways. For example, groups of partial products can be added together and then the sums of those groups can be added to produce a total of all the partial products. A circled dot in FIG. 5 represents a bit in an intermediate sum of partial product terms. Partial products P0 504, P1 505, P2 506, and P3 507 can be summed to produce intermediate sum S1 508 and, at the same time, partial products P4 509, P5 510, P6 511, and P7 512 can be summed to produce intermediate sum S2 513. Product 514 is then the sum of intermediate sum S1 508 and intermediate sum S2 513.

FIG. 6 depicts the alignment of the bits in two intermediate sums whose sum produces product 514 in FIG. 5. The sum of partial product terms P0 504, P1 505, P2 506, and P3 507 produces intermediate sum S1 508 and the sum of partial product terms P4 509, P5 510, P6 511, and P7 512 produces intermediate sum S2 513. Product 514 is the sum of intermediate sum S1 508 and intermediate sum S2 513. Intermediate sum S1 508 is the sum of early partial product terms, those partial product terms that are generated by multiplying fraction A 502 by bits in columns 0, 1, 2, and 3 in fraction C 503 that have less significance than the bits in columns 4, 5, 6, and 7 that generate the partial products that are summed to produce intermediate sum S2 513. The bits in intermediate sum S1 508 are therefore positioned more to the right relative to the bits in intermediate sum S2 513 because some of the bits in intermediate sum S1 508 (bits in columns 0, 1, 2, and 3) have less significance than any of the bits in intermediate sum S2 513. Therefore there is room to append leading-one correction term 601 to the left the bit in column 10 of intermediated term S1 508. In this way, leading-one correction term 601 is included in the summation of intermediate product term S1 508 and intermediate product term S2 513, without an additional stage of addition.

FIG. 7 depicts partial product adder array 701, in a technique in which the partial product terms P0 504, P1 505, P2 506, P3 507, P4 509, P5 510, P6 511, and P7 512 may be summed in $\log_2 n$ stages of addition, where n is the number of partial product terms summed. In this case, n is 8 and $\log_2 8$ is 3, therefore, 3 stages of addition are required. Partial product term P0 504 and partial product term P1 505 are summed in adder 705, which outputs their sum to adder 707. Partial product term P2 506 and partial product term P3 507 are summed in adder 704, which outputs their sum to adder 707. Partial product term P4 509 and partial product term P5 510 are summed in adder 703, which outputs their sum to adder 706. Partial product term P6 511 and partial product term P7 512 are summed in adder 702, which outputs their sum to adder 706. Adder 705, adder 704, adder 703, and adder 702 constitute the first stage of addition in partial product adder array 701. Adder 706 sums the inputs that it receives from adder 702 and adder 703 to produce intermediate sum S2 513, which is an input to adder 708. Adder 707 sums the input that it receives from adder 704 and adder 705 to produce intermediate sum S1 508. Adder 706 and adder 707 constitute the second stage of addition in partial product adder array 701. It is on the output of adder 707, intermediate sum S1 508, that leading-one correction term 601 is appended to intermediate sum S1 508, as shown in FIG. 6, and the result is input to adder 708. Adder 708 is the third and last stage of addition in partial product adder array 701 and it sums its two inputs to produce product 512. Therefore, leading-one correction term 601 has been included in the summation of partial products in partial product adder array 701 without an additional stage of addition.

Figure 8:
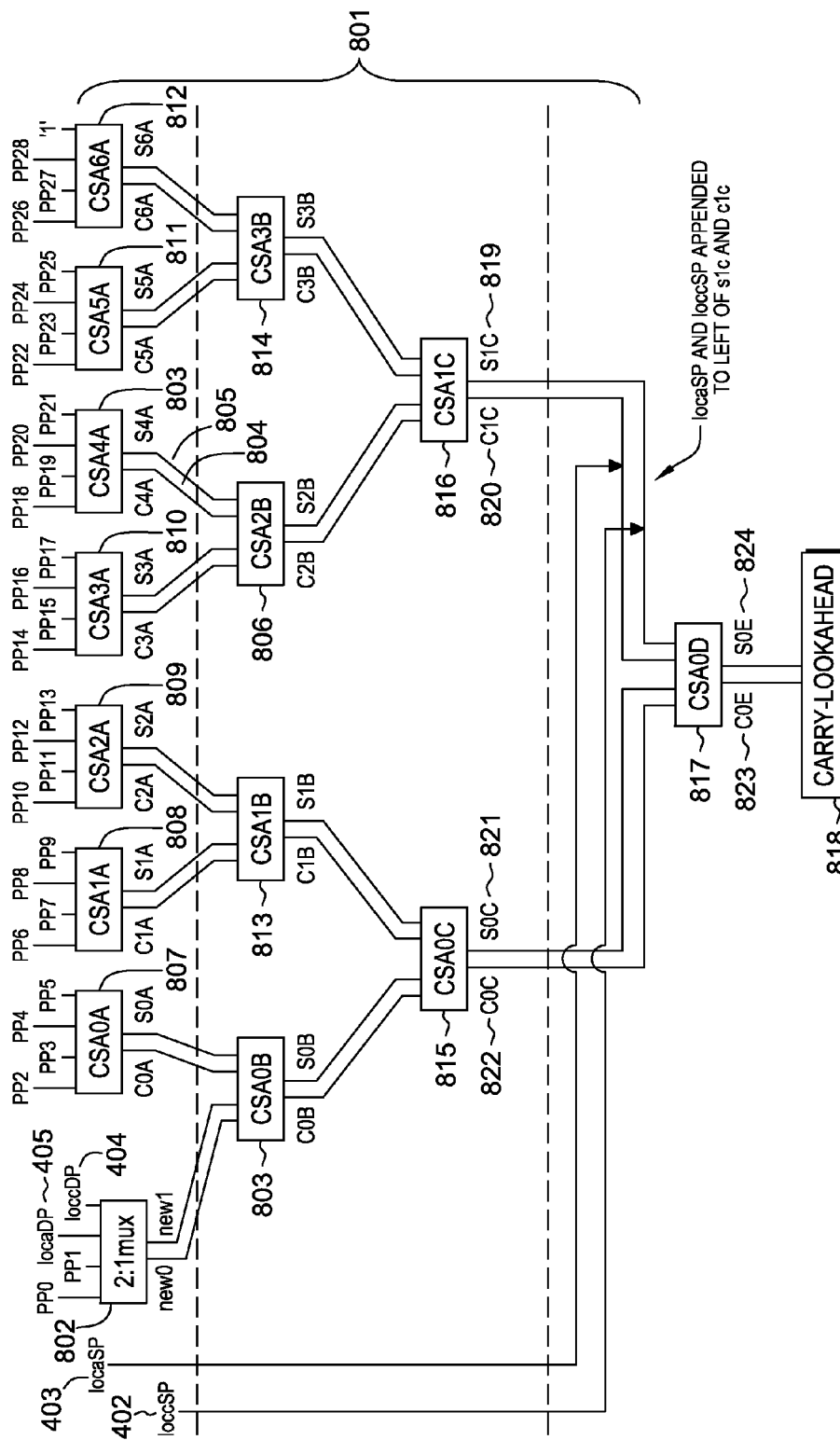
FIG. 8 depicts a block diagram of an adder array comprising (4:2) carry-save adders, in accordance with an embodiment of the present invention.

In an embodiment, adder array 307 is implemented as an array of (4:2) carry-save adders, adder array 801 depicted in FIG. 8. A (4:2) carry-save adder is a well-known type of adder that has 4 inputs and 2 outputs called a sum output and a carry output. The sum output is the sum of the bits on its inputs that is generated by not processing any carries between bits and the carry output consists of a record of all the carries that where not processed. The carries are "saved" and output on the carry output, thus the name carry-save adder. For example, if 0111 and 0101 (whose sum is 1100) are added by a carry-save adder, the sum output would be 0010 and the carry output would be 1010. The actual sum is generated by adding the sum output to the carry output in a carry-propagate adder (0010+1010=1100). The advantage of deferring a final addition of a sum term to a carry term is that it is not necessary to propagate the carries horizontally in adders during additions, which slows the speed of the additions considerably, until a final sum is desired. In fact, multiple stages of additions may be carried out before adding a sum output and a carry output together with a carry-propagate adder. A (4:2) carry-save adder sums the bits on four of its inputs and outputs a sum output and a carry output.

In an embodiment, adder array 801 sums partial product terms 306 that are in both in base-2 or both in base-16 and are a result of a multiplication of two single-precision numbers or two double-precision numbers. In an embodiment, the inputs to adder array 801 are partial product terms 306 that are radix-4 Booth encoded. Radix-4 Booth encoding is a well-known technique that can reduce the number of partial product terms associated with a multiplication of two numbers that are each n-bits long, from n partial product terms, to (n/2+1) partial product terms. This reduction in partial product terms enables fewer stages of addition to be used to sum the partial product terms, decreasing logic delay and enhancing performance.

In an embodiment, the fraction in a base-16 double-precision floating-point number is 56-bits long, which results in (56/2+1) or 29 partial product terms after radix-4 Booth encoding has been applied. Therefore, the number of required adder stages is $\log_2 29$, which when rounded up to the nearest integer is 5. Further 5 adder stages are required to add the 29 partial product terms. The 29 partial product terms are labeled PP0 through PP28 in FIG. 8. In an embodiment, the fraction in a base-2 double-precision floating point number is 52-bits, not including the implicit bit, resulting in (52/2+1) or 27 partial product terms, or 2 fewer partial product terms generated than in the base-16 double-precision case. However, $\log_2 27$ rounded up means that 5 adder stages are still needed for the base-2 double-precision case. Therefore, adder array 801 with five stages of adders adds the partial products created by the multiplication of two base-16 fractions or two base-2 fractions from two double-precision floating-point number. Partial products PP0 and PP1 are not generated and their inputs to adder array 801 are unused when the partial products resulting from a multiplication of two fractions that are in base-2 double-precision floating-point numbers are summed. In this case, 2:1 mux 802 selects leading-one correction terms locaDP and loccDP in the place of partial products PP0 and PP1, selecting them as inputs to second stage (4:2) carry-save adder, CSA0B 803. CSA0B 803 adds them to other partial products to make the necessary leading-one corrections. In an embodiment, leading-one correction terms locaDP and loccDP are full and direct inputs to CSA0B adder 803 where they are added to other partial product terms, i.e., they are not appended to the left of another input to an adder in adder array 801.

In an embodiment, the fraction in a base-16 single-precision floating-point number is 24-bits long, which results in (24/2+1) or 13 partial product terms after radix-4 Booth encoding has been applied. As such, the number of required adder stages is $\log_2 13$, which when rounded up to the nearest integer is 4. In an embodiment, the fraction in a base-2 single-precision floating-point number is 23-bits long, not including the implicit bit, which results in (23/2+1) or 13 partial product terms after radix-4 Booth encoding has been applied. Therefore, the number of required adder stages is $\log_2 13$, which when rounded up to the nearest integer is 4. Further, the partial products of the multiplication of the fractions in both base-2 and base-16 floating-point numbers are summed in adder array 801 which has 5 stages of adders.

The (4:2) carry-save adders in adder array 801 take four inputs and produce two outputs, a sum output and a carry output. For example, first stage (4:2) carry-save adder CS4A 803 accepts partial product terms PP18, PP19, PP20, and PP21 as inputs, sums them, and generates sum output S4A 805 and carry output C4A, which are inputs to second stage (4:2) carry-save adder CSA2B. First stage adders in adder array 801 are adders CSA0A 807, CSA1A 808, CSA2A 809, CSA3A 810, CSA4A 803, CSA5A 811 and CSA0A 812. Second stage adders in adder array 801 are adders CSA0B 803, CSA1B 813, CSA2B 806 and CSA3B 816. Third stage adders in adder array 801 are adders CSA0C 815 and CSA1C 816. Adder CSA0D 817 is the fourth stage adder and carry-lookahead adder 818, which adds the carry term and sum term on its two inputs to produce product 308, is the fifth stage. Those skilled in the art understand that there are many types of adders that may be used in adder array 801, for example, (3:2) carry-save adders, ripple-carry adders, lookahead carry units, full adders, and others. Other embodiments of the present invention use other types of adders in adder array 801.

In an embodiment, partial product terms PP14 through PP28 are generated by lower-order (less significant) bits in multiplier fraction C 318 in floating-point number C 302 relative to the bits in multiplier fraction C 318 that generate the other partial product terms in partial product terms 306. Therefore a bit-alignment occurs that is similar to the bit-alignment that occurs in partial product adder array 701 that adds 8-bit partial products P0 504 through P7 512. FIG. 6 shows that the bits in intermediate sum S1 508 extend more to the right into less significant bit positions than the bits in partial product sum S2 513, leaving space for leading-one correction term 601 to be appended to the left of intermediate sum S1 508.

The bits in multiplier fraction C 318 that contribute to sum S1C 819 and carry C1C 820 are less significant than those contributing to sum S0C 821 and carry C0C 822 and therefore the bits in sum S1C 819 and carry C1C 820 extend more to the right into less significant bit positions than the bits in sum S0C 821 and carry C0C 822. There is space to append leading one correction term locaSP 403 to the immediate left of the bits in carry C1C 820 and to append leading one correction term loccSP 402 to the immediate left of the bits in sum S1C 819. The loccSP 402 bits and the locaSP 403 bits appended to sum S1C 819 and carry C1C 820 bits respectively, do not extend further to the left than the bits in sum S0C 821 and in carry C0C 822. Adder CSA0D 817 adds carry C0C 822 to carry C1C 820 appended with locaSP 403 to produce carry C0E 823 and adds sum S0C 821 to sum S1C 819 appended with loccSP 402 to produce sum S0E 824. Carry-lookahead adder 818 adds carry C0E 823 to S0E 824 to produce product 308.

In this way, leading-one correction terms locaSP 403, loccSP, locaDP 405, and loccDP 404 are included in the summation of partial product terms 306 in adder array 807 without an additional stage of addition, wherein adder array 801 can sum the partial products of the multiplication of fractions in floating-point numbers that are in base-2 or in base-16 and both in single-precision or both in double-precision format.

In one embodiment, the processes described in the discussion of FIGS. 1-8 are embodied as a combination of electronic circuits (for example, combinations of semiconductor structures such as transistors, resistors, capacitors and the like that are organized into an electronic circuit that is configured to execute one or more of the processes described in the discussion of FIGS. 1-8) included in one or more integrated circuit chips. As such, the one or more integrated circuit chips are configured to execute at least a part of the processes described in the discussion of FIGS. 1-8. Such, integrated circuit chips may be incorporated as part of a computing system that is configured to execute at least a part of the processes described in the discussion of FIGS. 1-8.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

What is claimed is:

1. An integrated circuit chip for hiding implicit bit corrections in a partial product adder array in a binary and hexadecimal floating-point multiplier such that no additional adder stages are needed for the implicit bit corrections, the integrated circuit chip comprising:
   one or more electronic circuits configured to generate a first implicit bit correction term for a base-2 multiplier with an implicit bit that is one and a second implicit bit correction term for the base-2 multiplier with an implicit bit that is zero;
   one or more electronic circuits configured to generate a third implicit bit correction term for a base-2 multiplicand with an implicit bit that is one and a fourth implicit bit correction term for the base-2 multiplicand with an implicit bit that is zero;
   one or more electronic circuits configured to determine a value of a first implicit bit of the base-2 multiplier and a value of a second implicit bit of the base-2 multiplicand;
   one or more electronic circuits configured to receive a plurality of partial products of a product of the base-2 multiplier and the base-2 multiplicand;
   one or more electronic circuits configured to add, the plurality of partial products of the base-2 multiplier and the base-2 multiplicand in an adder array;
   one or more electronic circuits configured to append the first actual implicit bit correction term to the immediate left of a first addend to a first adder in the adder array such that a number of bits in the first actual implicit bit correction term does not exceed a number of bit positions between a left-most bit of the first addend and a left-most bit of a second addend to the first adder; and
   one or more electronic circuits configured to append the second actual implicit bit correction term to the immediate left of a third addend to a second adder in the adder array such that a number of bits in the second actual implicit bit correction term does not exceed a number of bit positions between a left-most bit of the first addend and a left-most bit of a fourth addend to the second adder.

2. The integrated circuit chip of claim 1, wherein the first implicit bit correction term is the first actual implicit correction term if the value of the first implicit bit of the base-2 multiplier is one.

3. The integrated circuit chip of claim 1, wherein the second implicit bit correction term is the first actual implicit correction term if the value of the first implicit bit of the base-2 multiplier is zero.

4. The integrated circuit chip of claim 1, wherein the third implicit bit correction term is the second actual implicit correction term if the value of the second implicit bit of the base-2 multiplicand is one.

5. The integrated circuit chip of claim 1, wherein the fourth implicit bit correction term is the second actual implicit correction term if the value of the second implicit bit of the base-2 multiplicand is zero.

6. The integrated circuit chip of claim 1, wherein the adder array is an array of carry-save adders.

7. The integrated circuit chip of claim 1, wherein the base-2 multiplier is a fraction in a single-precision floating-point number and the base-2 multiplicand is a fraction in a single-precision floating-point number.

8. The integrated circuit chip of claim 1, wherein the base-2 multiplier is a fraction in a double-precision floating-point number and the base-2 multiplicand is a fraction in a double-precision floating-point number.

9. The integrated circuit chip of claim 6, wherein the adders in the array of are (4:2) carry save adders.

* * * * *